United States Patent [19]
Leibowitz

[11] Patent Number: 6,037,866
[45] Date of Patent: Mar. 14, 2000

[54] HAZARD DEVICE FOR A VEHICLE

[76] Inventor: Donald Leibowitz, 7 Meadowview Dr., Cranbury, N.J. 08512-3009

[21] Appl. No.: 09/129,574

[22] Filed: Aug. 5, 1998

[51] Int. Cl.[7] .............................. B60Q 1/22; B60Q 7/00
[52] U.S. Cl. ......................... 340/473; 340/431; 340/463; 340/487; 40/606; 40/612
[58] Field of Search ..................... 340/463, 431, 340/433, 468, 471, 473, 487; 40/606, 612

[56] References Cited

U.S. PATENT DOCUMENTS

| | | | |
|---|---|---|---|
| 2,199,990 | 5/1940 | Godfrey et al. | 340/425.5 |
| 2,485,719 | 10/1949 | Edwards | 340/458 |
| 2,635,227 | 4/1953 | Liotta | 340/488 |
| 3,255,725 | 6/1966 | Von Kreidner et al. | 116/28 R |
| 3,852,582 | 12/1974 | Lowell | 240/1.3 |
| 4,087,785 | 5/1978 | Dodich | 40/550 |
| 4,142,172 | 2/1979 | Menard | 340/431 |
| 4,447,802 | 5/1984 | Bose | 340/473 |
| 4,559,518 | 12/1985 | Latta, Jr. | 340/433 |
| 4,825,192 | 4/1989 | Wells | 340/433 |
| 4,833,571 | 5/1989 | Granovsky | 362/16 |
| 4,857,807 | 8/1989 | Hargis | 315/77 |
| 4,871,995 | 10/1989 | Hoang | 340/487 |
| 4,894,755 | 1/1990 | Chandler | 362/83 |
| 4,903,174 | 2/1990 | Busby | 362/61 |
| 4,952,910 | 8/1990 | Straten et al. | 340/473 |
| 4,972,173 | 11/1990 | Raciti | 340/472 |
| 5,073,768 | 12/1991 | Willaredt | 340/475 |
| 5,097,612 | 3/1992 | Williams | 340/473 |
| 5,281,948 | 1/1994 | Estrada | 340/433 |
| 5,355,117 | 10/1994 | Jefferson | 340/425.5 |
| 5,406,250 | 4/1995 | Reavell et al. | 340/433 |
| 5,510,763 | 4/1996 | Deckard et al. | 340/431 |
| 5,572,188 | 11/1996 | McDowell, II | 340/473 |
| 5,692,445 | 12/1997 | Winer | 108/100 |
| 5,718,473 | 2/1998 | Lynch, Jr. | 297/16.2 |
| 5,743,037 | 4/1998 | Martin | 40/610 |

*Primary Examiner*—Daniel J. Wu
*Attorney, Agent, or Firm*—Mathews, Collins, Shepherd & Gould, P.A.

[57] ABSTRACT

The present invention relates to a hazard device for a vehicle in which an outwardly rotatable vertical panel attaches to the rear of the vehicle. The vertical panel can extend the entire height of the vehicle. A safety panel attaches to the vertical panel and extends to the ground. The vertical panel and safety panel provide protection to a person inspecting the vehicle. Alternatively, a portable hazard device is provided in which a plurality of foldable panel sections are connected. In the extended position, the portable hazard device has a height substantially the same as the vehicle. In the folded position, the portable hazard device can be transported in a vehicle.

15 Claims, 6 Drawing Sheets

HAZARD DEVICE FOR A VEHICLE

BACKGROUND OF THE INVENTION

1. Field of the Invention

The present invention relates to a hazard device for a vehicle including a hazard panel having a vertical height which is comparable to the height of the vehicle and which extends laterally from the vehicle in an emergency to provide a protective shield for a driver exiting the vehicle to inspect the vehicle. An alternate embodiment of the present invention relates to a portable hazard panel.

2. Description of the Related Art

Accidents involving trucks or vans parked along roadway shoulders in unlit areas have been numerous and severe often resulting in death as automobiles have collided with unnoticed parked trucks and vans. In addition, personnel inspecting their trucks have been hit by drivers moving too close to the parked vehicle.

Auxiliary signal lights for use in an emergency are known. U.S. Pat. No. 5,073,768 describes a fleet light panel attached at the rear of the trailer. Perimeter light units form first and second generally horizontal V-shaped arrowheads pointing in opposite directions.

Similarly, U.S. Pat. No. 4,903,174 describes an emergency rear light kit for temporary installation at the back of a vehicle or trailer. Two rear light units can be mounted on the back of the vehicle or trailer. An extension cable with a plug or socket extends between the light units and can be plugged into a cigarette lighter.

U.S. Pat. No. 5,510,763 describes a rear truck strobe light which flashes upon operation of hazard lights. The strobe light is placed on a centerline of the back panel of a truck where other lights are not normally found. Other attempts to provide warning signals for parked or disabled vehicles include signal flares which provide short term warning, see U.S. Pat. No. 2,199,990. Hazard mounted warning signs which include reflectors and indicia are described in U.S. Pat. No. 5,355,117. Emergency power packs to trigger warning signals flashing on trailers have been described in U.S. Pat. No. 4,142,172.

The above-described patents have the shortcoming that the signals are relatively small in relation to the height of the vehicle and do not provide visibility at great distances from the vehicle or on dark unlighted roads. Further, the light units of the above-described patents do not extend from the vehicle to provide safety for a person positioned beside the vehicle.

U.S. Pat. No. 4,825,192 describes a protective guard for a school bus having a series of telescoping members attached to the front of the bus. When the school bus stops, the members extend across the lane of oncoming traffic. Flashing red lights are mounted on the extended member. The guard has a substantially smaller height than the height of the vehicle and is positioned at the front of the bus, thereby not providing safety for a person standing along side the vehicle.

Of general interest are U.S. Pat. Nos. 2,485,719; 2,635,227; 3,255,725 and 4,559,518.

It is desirable to provide a hazard device attached to an outwardly rotatable panel such that the hazard device is more easily observed on larger vehicles and the panel provides protection of a person positioned along the side of the vehicle.

SUMMARY OF THE INVENTION

Briefly described, the present invention relates to a hazard device for a vehicle in which an outwardly rotatable vertical panel is attached to the rear of a vehicle. The vertical panel includes light units for providing a warning to other vehicles. Preferably, the vertical panel has a height that is substantially the same as the height of the vehicle for providing a warning that can be observed at a distance from the vehicle.

A safety panel can be attached to the bottom of the vertical panel to extend from the bottom of the vertical panel to the ground. The vertical panel and safety panel can be automatically activated from within the vehicle. The safety panel and vertical panel in the extended position enable a person to inspect the vehicle tires and undercarriage with protection from oncoming traffic.

The vertical panel and safety panel can have a mirrored surface which faces the vehicle when the panels are outwardly rotated. The mirrored surface provides a mirrored view to the driver of the side of the vehicle, including tires and undercarriage, without leaving the vehicle.

A charging system for the light units can be activated by the alternator of the vehicle or a rechargeable battery for providing extended use of the hazard device.

In an alternate embodiment, a portable hazard device includes a vertical panel formed of a plurality of foldable panel sections such that when the panel sections are folded the portable hazard device can be transported in a vehicle. Preferably, the portable hazard device is unfolded to extend to substantially the same height as the vehicle. A stand can receive the bottom of the unfolded panel and can be placed at an appropriate position in the roadway or behind the vehicle. The panel can include warning light units in an arrow shaped configuration which can be activated to blink for left or right signaling.

The invention will be further described by reference to the following drawings.

DETAILED DESCRIPTION

During the course of this description like numbers will be used to identify like elements according to the different figures which illustrate the invention.

Figure 1:
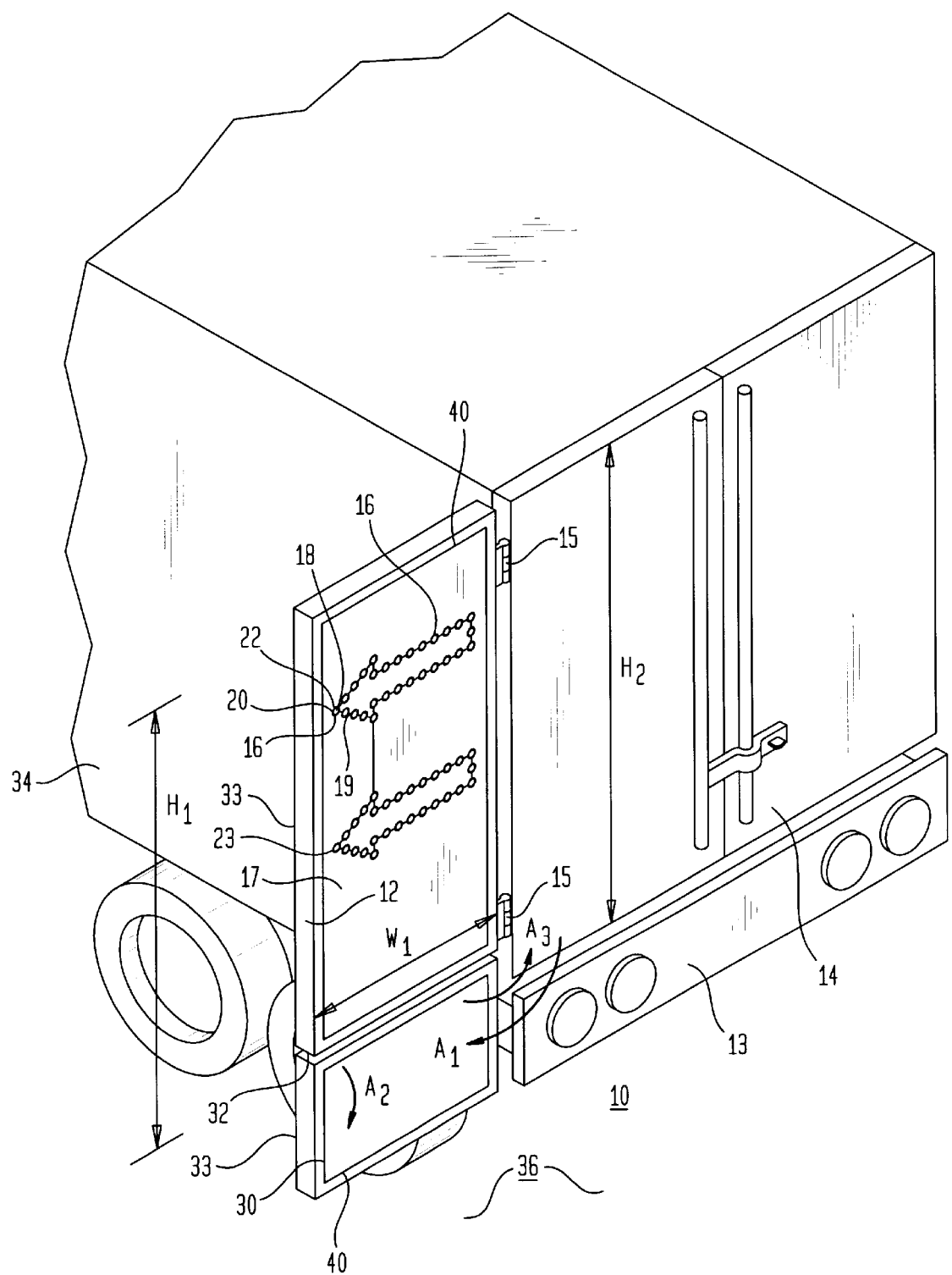
FIG. 1 is a perspective view of a hazard device for a vehicle in accordance with the teachings of the present invention.

FIG. 1 is a perspective view of a hazard device 10 in accordance with the teachings of the present invention. Vertical panel 12 is attached to vehicle 14. Preferably, vertical panel 12 is outwardly rotatable in the direction of arrow $A_1$, away from vehicle 14. Preferably panel 12 is positioned at rear 13 of vehicle 14. For example, vehicle 14 can be for example a truck, van or automobile. Vertical panel 12 preferably has a height $H_1$ which is substantially the same as height $H_2$ of rear 13 of vehicle 14. Vertical panel 12 preferably has a width $W_1$ of at least about 1 foot which extends from vehicle 12. Vertical panel 12 can be attached with hinges 15 to vehicle 14.

Figure 2:
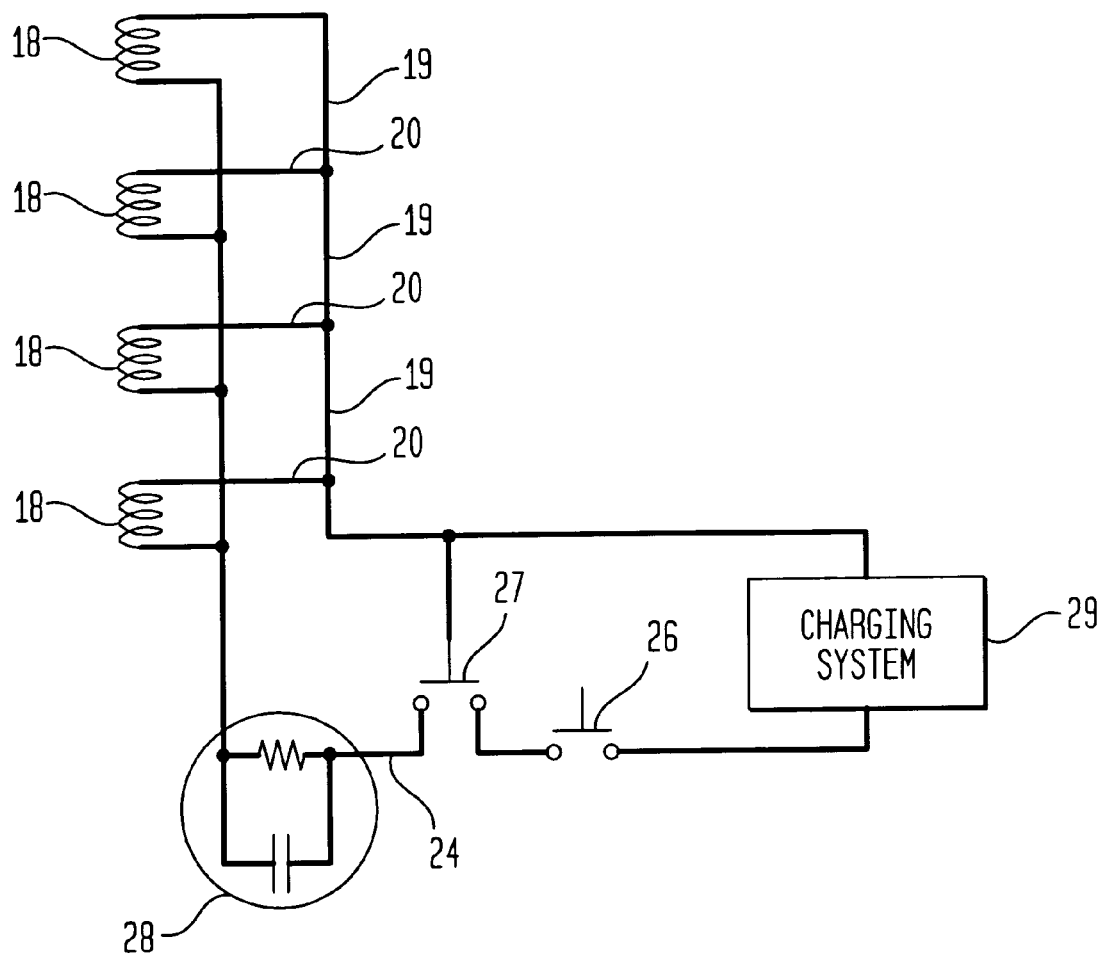
FIG. 2 is a schematic diagram of a light unit, switch and charging system of the present invention.

Light units 16 are attached to vertical panel 12. Light units 16 can be formed of socket 18 and light source 20, as shown in FIG. 2. For example, light source 20 can be an orange hazard lamp. Socket 18 can be positioned on outside surface 17 of vertical panel 12. Alternatively, socket 18 of light unit 16 can be positioned within vertical panel 12. In this embodiment, vertical panel 12 includes apertures 23 to receive light from light units 16 positioned beneath respective apertures 23. A protective cover 22 can be placed over light source 20.

Lamp connections 19 can be formed between light units 16. Light units 16 can be activated through an electrical connection 24 from lamp connections 19 to switch 26. Preferably, switch 26 is positioned a distance from rear 13 of vehicle 14, such as for example in the passenger area of the vehicle. Light units 16 can be activated intermittently with switch 28 for allowing light units 16 to blink when in use.

Energy source 27 can be attached to switch 26 for providing energy to light units 16. For example, energy source 27 can be a nickel cadmium battery. Energy source 27 can be charged from charging system 29. Charging system 29 can provide energy by being attached to an alternator of vehicle 14 or a battery supply.

Safety panel 30 can be attached to bottom edge 32 of vertical panel 12. Preferably, when in use safety panel 30 can be outwardly rotatable in the direction of arrow $A_2$. In this position, safety panel 30 extends from bottom of vehicle 14 to ground 36. After use, safety panel 30 can be rotated towards vertical panel 12 and vertical panel 12 can be rotated towards vehicle 14 so that vertical panel 12 can be stored against vehicle 14 and not encumber vehicle 14 during operation. Alternatively, safety panel 30 can be attached to vehicle 14 in the extended position.

Vertical panel 12 and safety panel 30 can be formed of, for example, fiberglass, sheet metal, stainless steel or aluminum. Rear side 33 of safety panel 30 or vertical panel 12 can have a mirrored surface for providing a mirrored view of side 34 of vehicle 14 as well as the tires or undercarriage of vehicle 14. Reflective material 40 can be attached to vertical panel 12 and safety panel 30 for providing additional ease of observation.

Figure 3A:
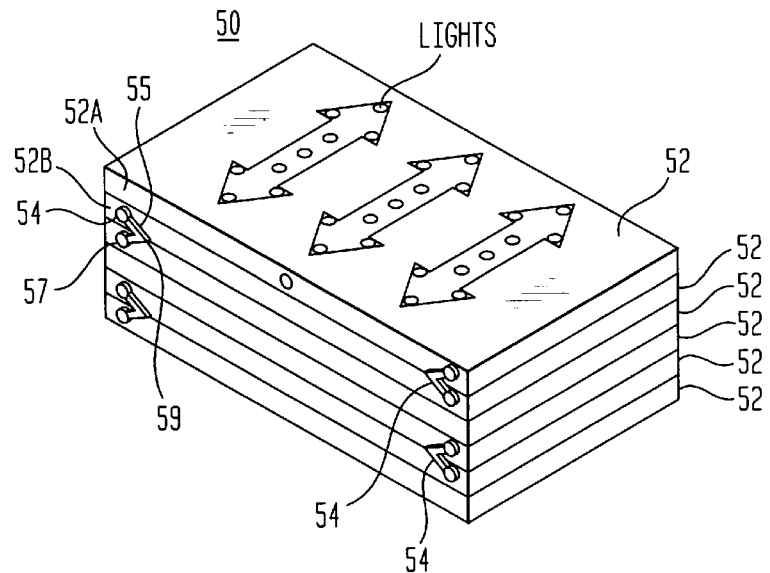
FIG. 3A is a perspective view of a portable hazard device in accordance with the teachings of the present invention in a folded position.
Figure 3B:
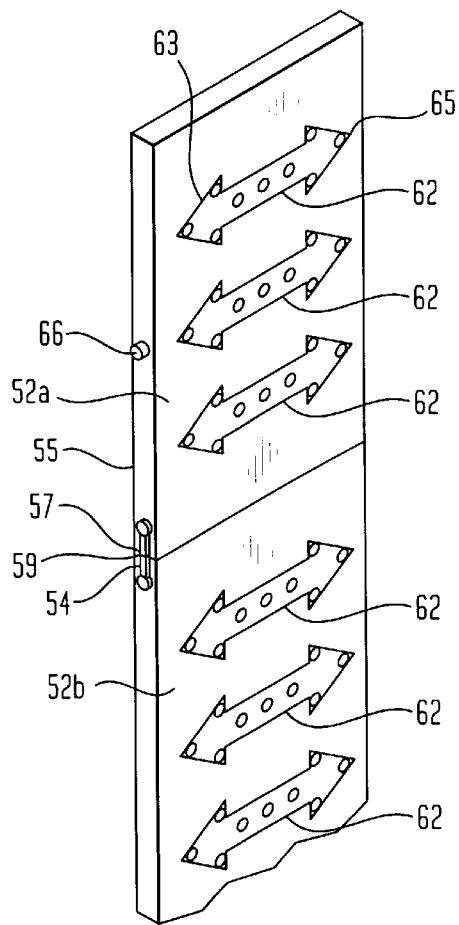
FIG. 3B is a perspective view of the portable hazard stand in the extended position.

FIG. 3A and 3B illustrate an alternative embodiment of the present invention of a folding vertical hazard panel 50. A plurality of panel sections 52 are connected to one another with hinges 54. Leg 55 of hinge 54 is attached to panel section 52a and leg 57 of hinge 54 is attached to panel section 52b. Leg 55 is coupled to leg 57 with pivot 59. As shown in FIG. 3A, when folding vertical hazard panel 50 is in the folded position leg 55 and leg 57 are rotated with pivot 59 into a retracted position allowing folding panel 52a to be folded on top of panel 52b. In the folded position, vertical panel hazard panel 50 can be transported in the body or trunk of a vehicle.

As shown in FIG. 3B, when folding vertical hazard panel 50 is in the unfolded position leg 55 and leg 57 are rotated with pivot 59 into an extended position allowing panel 52a to be unfolded from panel 52b. Preferably, in the unfolded position folding vertical hazard panel 50 has a height $H_2$ that is substantially the same or greater than the height of vehicle 14.

Warning lights 62 can be arranged in an arrow shaped configuration. Warning lights 62 at arrow head end 63 can be activated for left signaling and warning lights 62 at arrow head end 65 can be activated for right signaling. Alternatively, warning lights 62 at arrow head end 63 and warning lights at arrow head end 65 can be activated simultaneously. Switch 66 can connect folding vertical hazard panel 50 to an energy source 68. For example, energy source 68 can be a 12 volt DC battery.

Figure 4A:
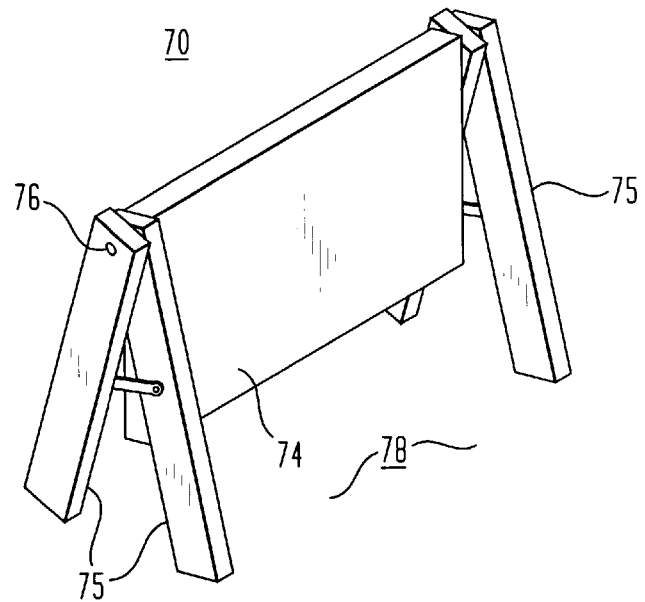
FIG. 4A is a perspective view of a panel stand in an extended position.
Figure 4B:
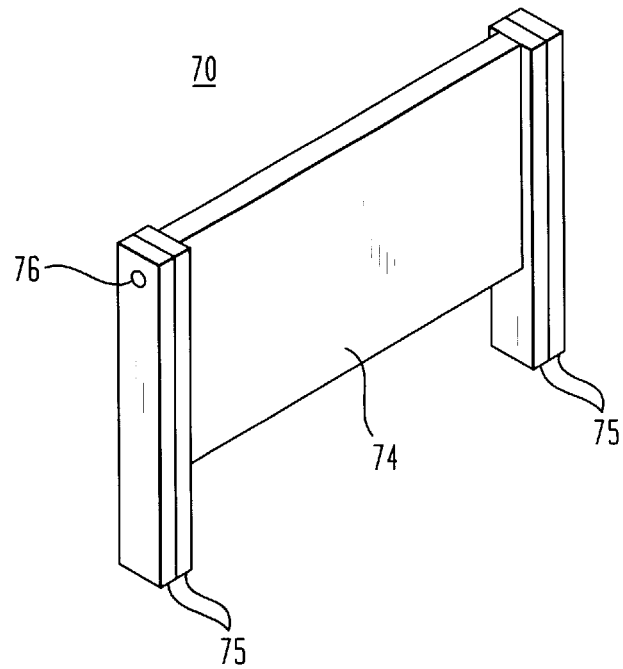
FIG. 4B is a perspective view of the panel stand in a folded position.

Panel stand 70 can be used to mount vertical hazard panel 50 in the unfolded position. Panel stand 70 can be placed at the back of vehicle 14 or in the roadway for alerting oncoming vehicles of a hazard condition. Bottom edge 72 of folding vertical hazard panel 50 is received in cavity 74 of panel stand 70. Legs 75 are attached to panel stand with pivot 76. In the extended position, shown in FIG. 4A, legs 75 support panel stand 70 on ground surface 78. Legs 75 can be pivoted to fold legs 75 together, thereby allowing support panel stand 70 to be easily portable in the body or trunk of a vehicle as, shown in FIG. 4B.

Vertical panel 12 and safety panel 30 can be automatically activated from within the vehicle with activation apparatus 80.

Figure 5:
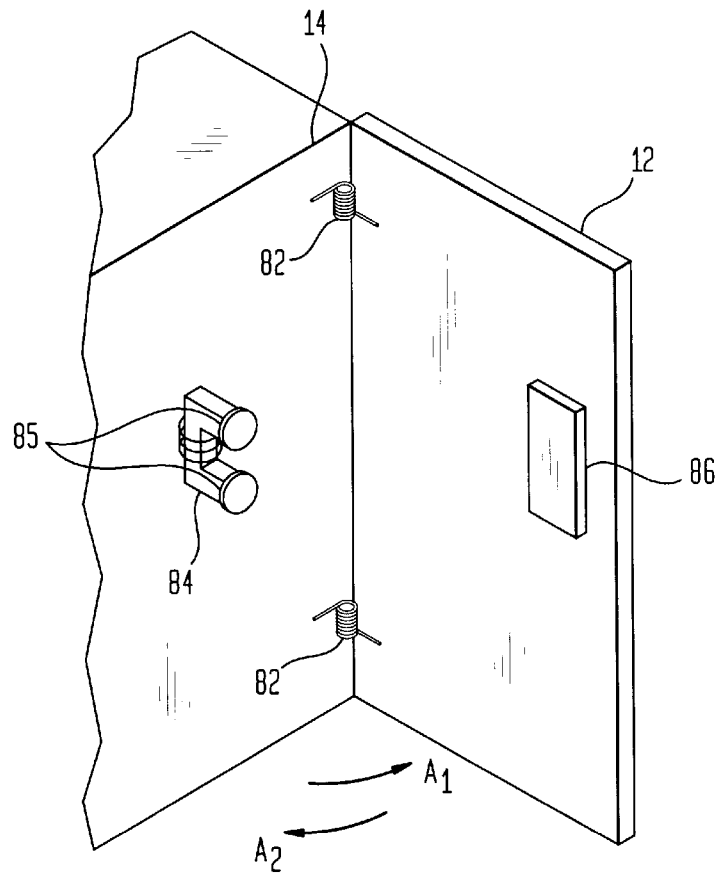
FIG. 5 is a perspective view of an embodiment of an activation means for the vertical panel including biasing and electromagnetic means.

In a first embodiment shown in FIG. 5, vertical panel 12 is outwardly rotated from vehicle 14 in the direction of arrow $A_1$ with torsion springs 82. Electromagnet 84 is attached to vehicle 14. Electromagnet 84 is activated from within the vehicle 14 with connection 85 for inwardly rotating vertical panel 12 in the direction of arrow $A_2$. Magnetic keeper 86 is attached to vertical panel 12. Electromagnet 84 contacts magnetic keeper 86 for retaining vertical panel 12 against vehicle 14. Electromagnet 84 is deactivated by turning off power to connection 84 for displaying vertical panel 12.

Figure 6:
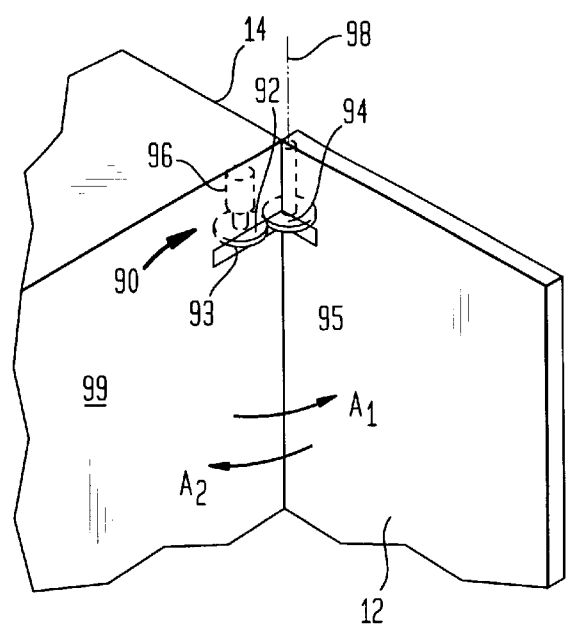
FIG. 6 is a perspective view of an embodiment of an activation means for the vertical panel including a worm gear assembly.

In a second embodiment shown in FIG. 6, vertical panel 12 is outwardly rotated in the direction of arrow $A_1$ with worm gear assembly 90. A first worm gear 92 is attached to vehicle 14 and a second worm gear 94 is attached to vertical panel 12. Teeth 93 of first worm gear 92 engage teeth 95 of second worm gear 94. A direct current motor 96 is attached to worm gear assembly 90. Panel pivot shaft 98 extends through second worm gear 94. Upon activation, direct current motor 96 rotates panel pivot shaft 98. Direct current motor 96 can be activated from within vehicle 14 with connection 99. Vertical panel 12 can be rotated inwardly in the direction of arrow $A_2$ by reversing the current to direct current motor 96 to reverse the rotation of panel pivot shaft 98.

Figure 7:
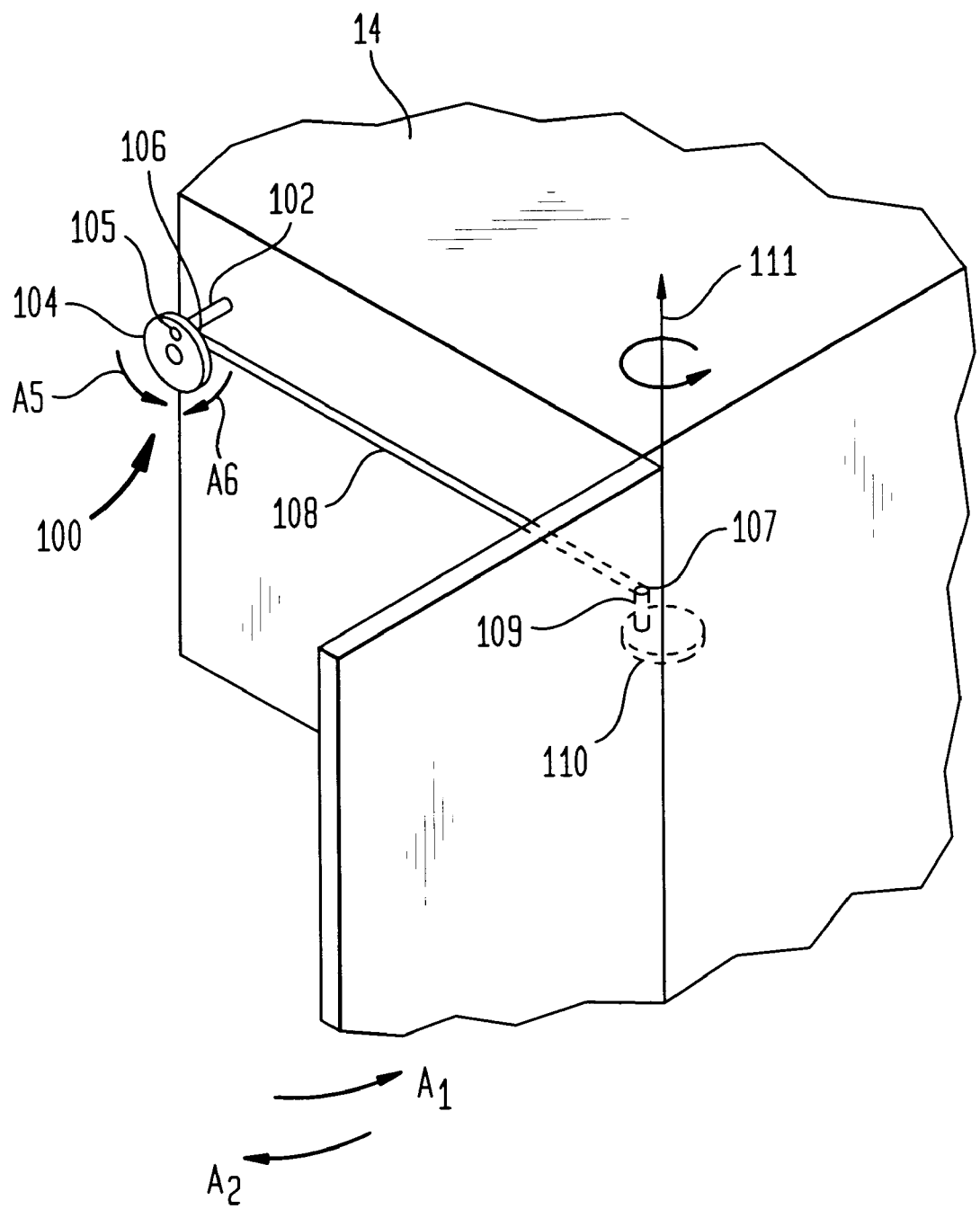
FIG. 7 is a perspective view of an embodiment of an activation means for the vertical panel including a pivot wheel assembly.

In a third embodiment shown in FIG. 7, vertical panel 12 is outwardly rotated in the direction of arrow $A_1$ with a pivot wheel assembly 100. Pivot wheel assembly 100 comprises a pivot wheel handle 102 connected to vertical pivot wheel 104. Pivot wheel handle 102 can be positioned within vehicle 14. Vertical pivot wheel 104 is connected by rotating pin 105 to end 106 of connecting lever 108. End 107 of connecting lever 108 connects to rotating pin 109. Rotating pin 109 is connected to horizontal pivot wheel 110. A panel pivot rod 111 extends through horizontal pivot wheel 110 and vertical panel 14. Pivot wheel handle 102 can be rotated counter clockwise in the direction of arrow $A_5$ to rotate vertical pivot wheel 104 counterclockwise which rotates horizontal pivot wheel 110 and panel pivot rod 111 in a counterclockwise direction of arrow $A_5$ for outwardly rotating vertical panel 12 in the direction of arrow $A_1$. Pivot wheel handle 102 can be rotated in a clockwise direction of arrow $A_6$ to inwardly rotate vertical panel in the direction of arrow $A_2$.

While the invention has been described with reference to the preferred embodiment, this description is not intended to be limiting. It will be appreciated by those of ordinary skill in the art that modifications may be made without departing from the spirit and scope of the invention.

I claim:

1. A hazard device for a vehicle comprising:

an outwardly rotatable vertical panel;

attachment means for attaching said vertical panel to the rear of said vehicle;

a safety panel foldably attached to said vertical panel when said safety panel is in an extended position said safety panel extends from the bottom of said vertical panel to the ground;

a rear surface of said safety panel and said vertical panel is mirrored, said rear surface faces said vehicle when said safety panel and said vertical panel are rotated from said vehicle; and light means for providing a warning to other vehicles, said light means being attached to a front surface said vertical panel said front surface faces away from said vehicle when said safety panel and said vertical panel are rotated from said vehicle;

wherein the height of said vertical panel is substantially the same as the height of said vehicle.

2. The device of claim 1 wherein said vehicle is a truck trailer and the vertical panel extends the height of the trailer.

3. The device of claim 1 wherein said vertical panel is formed of a material selected from the group consisting of fiberglass, sheet metal, stainless steel and aluminum.

4. The device of claim 1 wherein said light means comprises:

a plurality of lamps received in a respective one of a plurality of sockets, said sockets being attached in the interior of said vertical panel; and energy connection means between said sockets positioned in said vertical panel.

5. The device of claim 1 wherein said vertical panel extends at least about one foot laterally from said vehicle.

6. The device of claim 1 further comprising:

a reflective material attached to said vertical panel.

7. The device of claim 1 wherein said attachment means comprises a plurality of hinges having a first end attached to said vehicle and a second end attached to said vertical panel.

8. The device of claim 1 further comprising:

an energy source coupled to said light means; and charging means for charging said energy source.

9. The device of claim 1 further comprising:

switch means connected to said light means for intermittently activating such light means.

10. The device of claim 9 wherein said switch is positioned in a passenger area of said vehicle.

11. The device of claim 1 further comprising:

activation means coupled to said panel, said activation means rotating said vertical panel.

12. The device of claim 11 wherein said activation means comprises:

a pivot handle attached to a vertical pivot wheel, said pivot handle being positioned in a passenger area of said vehicle;

a connecting lever attached to said horizontal pivot wheel; and pivot means attached to said panel, said pivot means being coupled to said horizontal pivot wheel;

wherein rotation of said pivot handle in a counterclockwise direction rotates said horizontal pivot wheel in a counterclockwise for outwardly rotating said vertical panel away from said vehicle and rotation of said pivot handle in a clockwise direction rotates said horizontal pivot wheel in a clockwise direction for inwardly rotating said vertical panel towards said vehicle.

13. The device of claim 11 wherein said activation means comprises a switch positioned in a passenger area of said vehicle.

14. The device of claim 13 wherein said activation means comprises:

spring means attached to said vertical panel and said vehicle for biasing said vertical panel outwardly from said vehicle;

electromagnet means attached to said vehicle; and said switch being attached to said electromagnet means;

magnetic keeper means attached to said vertical panel, wherein activation of said electromagnet means by said switch inwardly rotates said vertical panel towards said vehicle until engagement of said electromagnet means with said magnetic keeper means.

15. The device of claim 13 wherein said activation means comprises:

a first worm gear attached to said vehicle;

a second worm gear attached to said vertical panel;

said first worm gear engaging said second worm gear; and motor means attached to said first worm gear or said second worm gear, wherein activation of said motor by said switch rotates said vertical panel outwardly away from said vehicle and reversing the current to said motor means rotates said vertical panel inwardly towards said vehicle.

* * * * *